(12) United States Patent
Lagha et al.

(10) Patent No.: US 10,904,021 B1
(45) Date of Patent: Jan. 26, 2021

(54) SYSTEM, METHOD, AND COMPUTER PROGRAM FOR DYNAMIC SWITCHING BETWEEN ONLINE AND OFFLINE CHARGING FOR A NETWORK SESSION

(71) Applicant: Amdocs Development Limited, Limassol (CY)

(72) Inventors: Naceur Lagha, Nice (FR); Omer Shani, Savyon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/595,131

(22) Filed: Oct. 7, 2019

(51) Int. Cl.
*H04M 11/08* (2006.01)
*H04L 12/14* (2006.01)
*H04M 15/00* (2006.01)
*H04W 4/24* (2018.01)

(52) U.S. Cl.
CPC ........ *H04L 12/1407* (2013.01); *H04M 15/41* (2013.01); *H04M 15/64* (2013.01); *H04M 15/65* (2013.01); *H04M 15/8228* (2013.01); *H04W 4/24* (2013.01)

(58) Field of Classification Search
None
See application file for complete search history.

(56) References Cited

U.S. PATENT DOCUMENTS

2020/0092423 A1* 3/2020 Qiao ..................... H04W 60/06

* cited by examiner

*Primary Examiner* — Gary Lafontant
(74) *Attorney, Agent, or Firm* — Zilka-Kotab, P.C.

(57) ABSTRACT

As described herein, a system, method, and computer program are provided for dynamic switching between online and offline charging for a network session. In use, a network session is monitored. Additionally, during the network session, one or more characteristics of the network session are determined, based on the monitoring of the network session. Further, a dynamic selection is made between offline charging and online charging for the network session, based on the one or more characteristics of the network session.

18 Claims, 5 Drawing Sheets

SYSTEM, METHOD, AND COMPUTER PROGRAM FOR DYNAMIC SWITCHING BETWEEN ONLINE AND OFFLINE CHARGING FOR A NETWORK SESSION

FIELD OF THE INVENTION

The present invention relates to system implemented network session charging modes.

BACKGROUND

A network session is generally a temporary and interactive information interchange over a network between two or more communicating devices (e.g. client and/or server devices). The information interchange may include requests for information (e.g. data, content, etc.) and/or responses with information. Typically, the network session is created when the information interchange is initiated by one of the communicating devices, and is brought to an end when the information interchange terminates.

In most cases, network service providers charge owners, or responsible entities, of one or both of the communicating devices for network sessions. The charging is performed according to a policy assigned to the owner(s) and/or communicating device(s), or according to a subscription of the owner(s) to the network service offered by the network service provider. To date, however, a network session can only be charged according to one of two modes: an online charging mode or an offline charging mode. In other words, the charging mode for a network session is selected upon creation of the session, and is valid for the overall lifetime of the network session without any ability to change. Unfortunately, there are advantages and disadvantages to each charging mode that are dependent on the characteristics of the network session. As a result, the desire to use one charging mode over the other may change during the lifetime of the network session as the characteristics of the network session change.

There is thus a need for addressing these and/or other issues associated with the prior art.

SUMMARY

As described herein, a system, method, and computer program are provided for dynamic switching between online and offline charging for a network session. In use, a network session is monitored. Additionally, during the network session, one or more characteristics of the network session are determined, based on the monitoring of the network session. Further, a dynamic selection is made between offline charging and online charging for the network session, based on the one or more characteristics of the network session.

DETAILED DESCRIPTION

Figure 1:
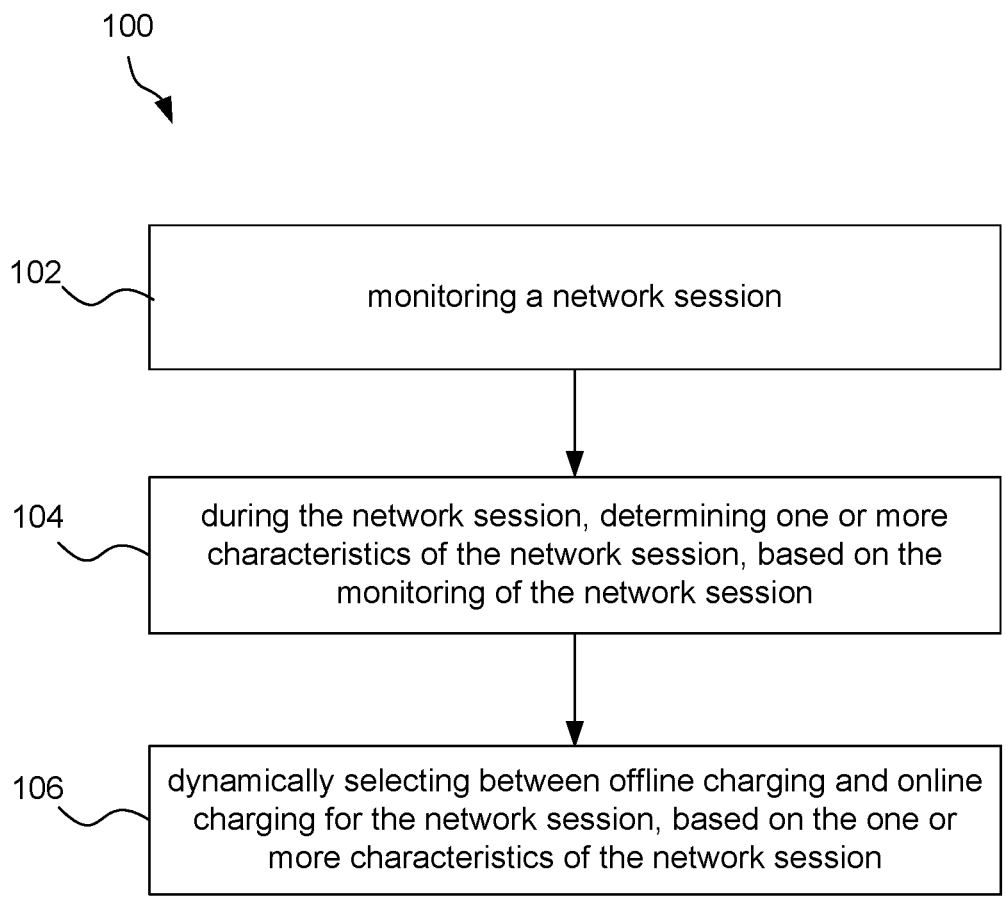
FIG. 1 illustrates a method for dynamic switching between online and offline charging for a network session, in accordance with one embodiment.

FIG. 1 illustrates a method 100 for dynamic switching between online and offline charging for a network session, in accordance with one embodiment. The method 100 may be performed by a computer system, such as those described below with reference to FIGS. 2-5. The computer system may be configured for implementing charging and session control for the network session.

Further, the method 100 is performed when the network session is established with a dynamic charging mode indicating that dynamic switching between online and offline charging is to be performed for the network session. The dynamic charging mode is a charging mode option separate from the traditional online and offline charging modes that, when assigned to an established network session, have traditionally been implemented for an entire duration of the network session.

In the context of the present description, the network session refers to any instance of a network connection established between at least two communication devices for the purpose of enabling the communication devices to communicate therebetween. For example, the communication devices may include client devices, server devices, or a combination thereof. Thus, the method 100 may be performed for one of the communication devices, or independently for each of the communication devices, namely whichever is usually preferred for network session charging.

As shown in operation 102, a network session is monitored. In one embodiment, the network session may be monitored by monitoring information associated with the network session. For example, the information associated with the network session may be received from a session management function utilized for managing (e.g. a lifecycle) of the network session. It should be noted that the information may describe or otherwise be associated with any aspects of the network session, for use as described with reference to operation 104 below.

Additionally, in operation 104, during the network session, one or more characteristics of the network session are determined, based on the monitoring of the network session. As noted above, information associated with the network session may be monitored in operation 102. In this case, the characteristic(s) of the network session may be determined from the information.

In one embodiment, the characteristic(s) of the network session may include a balance of an allowed limit of network service usage for a communication device that is a party to the network session. Such balance may be a current balance at the time the characteristic(s) of the network session are determined. In the present embodiment, the allowed limit of network service usage may be defined in a subscription of the communication device to a network service over which the network session has been established. Of course, however, it should be noted that any prescribed characteristic(s) of the network session may be determined for the reasons set forth below.

Further, in operation 106, a dynamic selection is made between offline charging and online charging for the network session, based on the characteristic(s) of the network session. In the present description, offline charging may refer to a charging scheme in which charging is performed at an end (termination) of the network session, but in essence is defined as a charging mechanism where charging information does not affect, in real-time, the network service rendered through the network session (i.e. that is unable to affect the network session in real-time). Online charging, on the other hand, may refer to a charging scheme in which charging is performed throughout a duration of the network session, but in essence is defined as a charging mechanism where charging information can affect, in real-time, the network service rendered (i.e. that is able to affect the network session in real-time). Different from the offline charging, the online charging may require direct interaction of a charging function with a session management function to control the network session.

Accordingly, the offline charging may require less resource usage (e.g. control signaling) than the online charging. However, the online charging may require more resource usage (e.g. control signaling) than the offline charging to continuously manage the balance of the allowed limit during the network session.

In general, a policy or rule may be applied to the characteristic(s) of the network session for determining which charging scheme (offline or online) to select. In one exemplary embodiment where the characteristic(s) of the network session include a balance of an allowed limit of network service usage for the communication device, the offline charging may be selected for the network session when the balance of the allowed limit of the network service usage is above a predefined threshold. For example, the offline charging may be selected for the network session when the balance is sufficiently high (determined per the threshold) that there is in turn a sufficiently low risk the network session will consume more than the remaining balance.

In another embodiment, the online charging may be selected for the network session when the balance of the allowed limit of the network service usage is below the predefined threshold. For example, the online charging may be selected for the network session when the balance is sufficiently low (determined per the threshold) that there is in turn a sufficiently high risk the network session will consume more than the remaining balance.

In this way, the method 100 may dynamically change the charging scheme utilized for the network session, even during the network session. This may allow resource usage related to the charging scheme to be reduced when possible. In particular, as described above, the offline charging may be used during the network session to reduce resource usage when the online charging is deemed to not be needed or sufficiently beneficial for the network session (e.g. when there is a sufficiently low risk the network session will consume more than the remaining balance). However, to ensure that the network session does not consume more than the balance, the method 100 may allow for the charging scheme to be dynamically switched to the online charging once the criteria for the offline charging (e.g. sufficiently low risk the network session will consume more than the remaining balance) is no longer met for the network session.

In one embodiment, the method 100 may be repeated while the network session is assigned the dynamic charging mode. For example, the characteristic(s) of the network session may be determined for each interaction between the session management function and a charging function in association with the network session. In this way, the dynamic selection may be made periodically, as desired, during the network session (e.g. for each above mentioned interaction).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
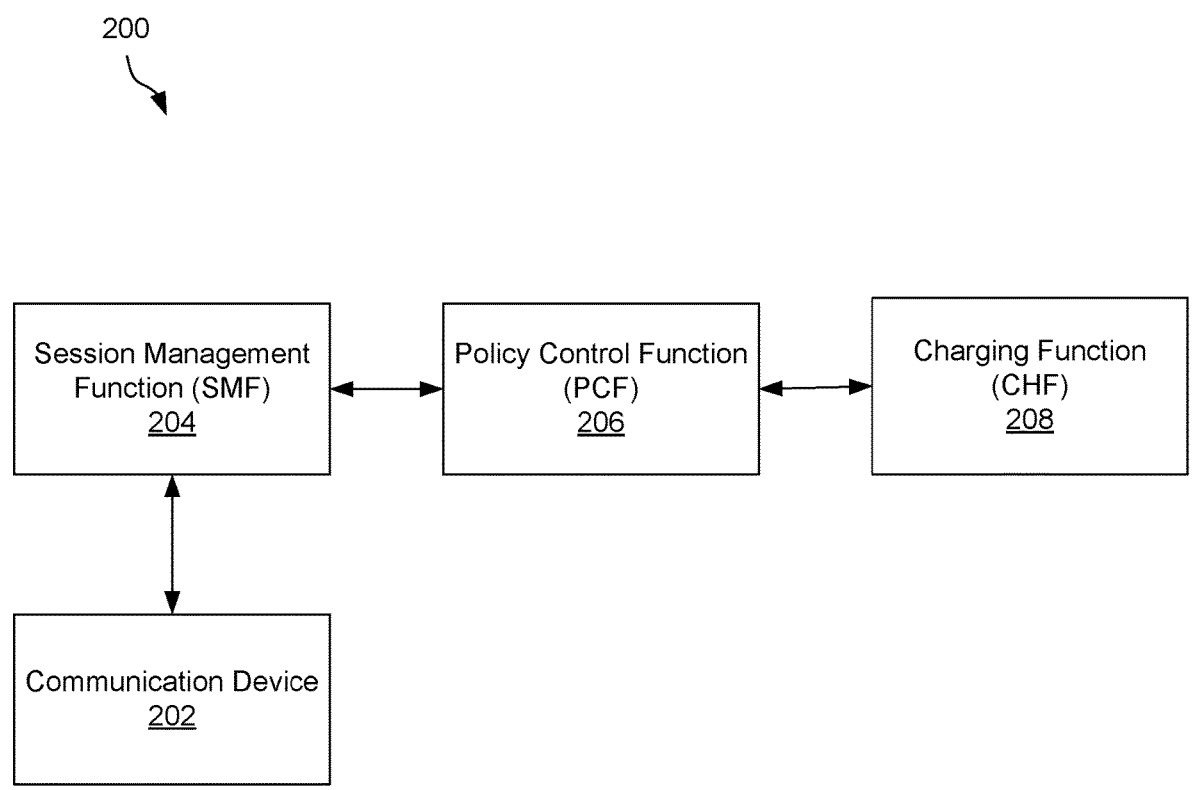
FIG. 2 illustrates a block diagram of a system for dynamic switching between online and offline charging for a network session, in accordance with one embodiment.

FIG. 2 illustrates a block diagram of a system 200 for dynamic switching between online and offline charging for a network session, in accordance with one embodiment. As an option, the system 200 may be implemented in the context of the computer system mentioned above with reference to FIG. 1. For example, the components of the system 200 described below may be implemented on a single computing device, or across a plurality of computing devices. Further, the aforementioned definitions may equally apply to the description below.

As shown, a communication device 202 interacts with a session management function (SMF) 204. In one embodiment, the communication device 202 may send a request to establish a network session with another communication device (not shown). In response, the SMF 204 may create the network session.

As also shown, the SMF 204 communicates with a policy control function (PCF) 206. For example, SMF 204 may notify the PCF 206 of the established network session. The PCF 206 may operate to provide policy-based control of the network session.

Further, the PCF 206 communicates with a charging function (CHF) 208. The CHF 208 controls charging for the network session. The PCF 206 may notify the CHF 208 of the established network session so that the CHF 208 can select a charging mode for the network session, namely a dynamic charging mode, an online charging mode, or an offline charging mode. When the dynamic charging mode is selected, the CHF 208 may operate according to the method 100 of FIG. 1.

Figure 3:
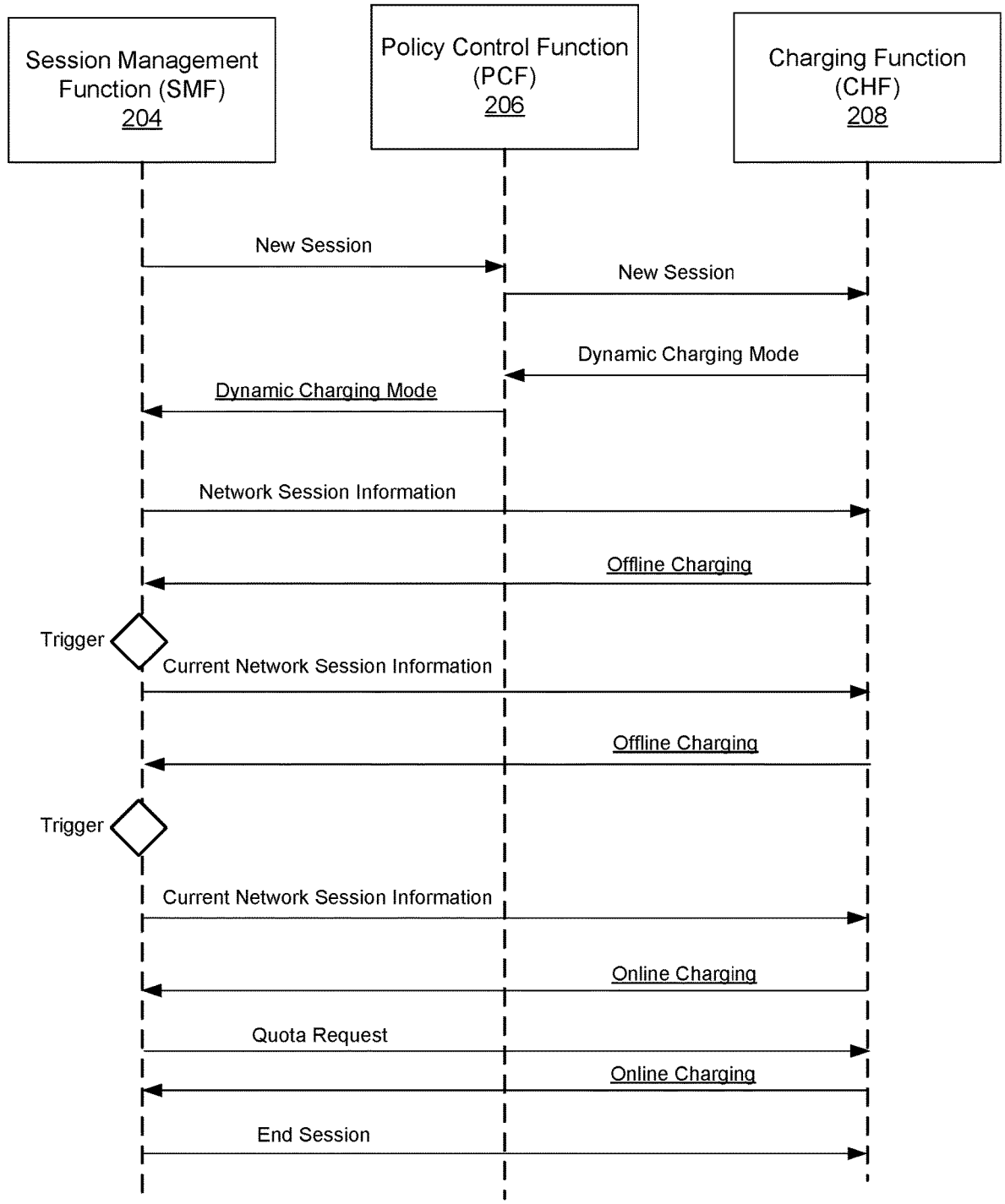
FIG. 3 illustrates a communication flow diagram of an exemplary implementation of the system of FIG. 2, in accordance with one embodiment.

FIG. 3 illustrates a communication flow diagram of an exemplary implementation of the system of FIG. 2, in accordance with one embodiment.

As shown, the SMF 204 notifies the PCF 206 of a newly established network session. In turn, the PCF 206 notifies the CHF 208 of the newly established network session. The CHF 208 selects the dynamic charging mode for the network session, and notifies the PCF 206 of the dynamic charging mode which in turn notifies the SMF 204 of the dynamic charging mode. The dynamic charging mode may indicate to the SMF 204 that the dynamic selection between the offline charging and the online charging will be controlled by the CHF 208 for the duration of the network session.

Responsive to the notification of the dynamic charging mode for the network session, the SMF 204 sends to the CHF 208 initial information associated with the network session, such as account information for the communication device 202. The CHF 208 then determines, from the initial information, one or more characteristics of the network session, such as a balance of an allowed limit of network service usage for the communication device 202. Based on the characteristic(s), and according to the characteristics, the CHF 208 dynamically selects between online and offline charging for the network session.

In the exemplary implementation shown in FIG. 3, the CHF 208 dynamically selects offline charging for the network session, and communicates this selection to the SMF 204. For example, where the characteristic(s) indicate that the balance of the allowed limit of network service usage for the communication device 202 is above a threshold, the CHF 208 may select the offline charging for the network session. Offline charging is therefore implemented for the network session.

The communication of the offline charging selection from the CHF 208 to the SMF 204 may also indicate one or more triggers upon which the SMF 204 is to communicate further information associated with the network session to the CHF 208. These triggers may include a specified amount (volume) of network traffic communicated over the network session and/or a specified duration of time having passed.

After some period of time (e.g. responsive to a trigger), the SMF 204 sends current network session information to the CHF 208. In this way, the CHF 208 will again determine from the current network session information characteristic(s) of the network session, and based on the characteristic(s) dynamically select between online and offline charging for the network session. In the exemplary implementation shown in FIG. 3, the CHF 208 dynamically selects offline charging for the network session, based on the current network session information (e.g. where the characteristic(s) determined from the current network session information indicate that the balance of the allowed limit of network service usage for the communication device 202 is still above the threshold). Offline charging is therefore implemented for the network session. The CHF 208 communicates the offline charging selection to the SMF 204, which again may indicate one or more triggers upon which the SMF 204 is to communicate further information associated with the network session to the CHF 208.

Again, after some period of time (e.g. responsive to a trigger), the SMF 204 sends additional current network session information to the CHF 208. The CHF 208 will thus again determine from the additional current network session information characteristic(s) of the network session, and based on the characteristic(s) dynamically select between online and offline charging for the network session. In the exemplary implementation shown in FIG. 3, the CHF 208 dynamically selects online charging for the network session. Online charging is therefore implemented for the network session. The CHF 208 communicates the online charging selection to the SMF 204.

Due to the implementation of online charging, the SMF 204 sends a quota request to the CHF 208 during the network session. The quote request refers to a current balance of the of the allowed limit of network service usage for the communication device 202. These quota requests will be sent periodically by the SMF 204 to the CHF 206 (e.g. at a greater rate than the trigger-based communications described above), in order to allow for real-time or near-real time changes to the network session as required based on the current balance values. In response to the quota request, the CHF 208 will perform quota management in association with the online charging. Quota management involves the calculation of the quota, and a validity time (VT) associated with it (i.e. the period in which the quota can be consumed), which can be quite complex depending on several parameters such as consumption rate and number of other users consuming from the same balance. In addition, it requires verification of all amounts involved as the balance relates to real money. If the validity time is reached before full consumption of the quota, a new request for a new quota must be made, returning the unused quota to the CHF 206. Finally, in the exemplary implementation shown in FIG. 3, the network session is ended, which is communicated from the SMF 204 to the CHF 208.

Exemplary Use-Case

Allowances of average telecommunication service plans are increasing year over year subsequently to exponential data consumption growth. As a result, most of users will not reach the defined allowance limits before a service plan expire/renewal date. For the few users who may reach the defined limits, most of them will do so very close to the date of expiry/renewal of their plan. This means that for a given request for a quota, the probability that service will be denied because of a reached limit is small, and is shrinking over time.

In this situation, running the complex schema of online charging causes more network traffic than necessary, requires the servers to maintain more context, and require the servers to perform more complex calculations than necessary. Starting a network session while taking into account the balance reserves the user or communication device has will enable handling the network session with more efficiency. In fact, if the system is capable to switch between the two charging methods (online/offline), based on these reserves, then it can increase efficiency as it may select offline charging in case of high reserves and online charging in case of low reserves. Knowing that the probability of low reserves is small, most of the time the network session will be handled with offline charging which means with less complexity. In this case, complex balance and quota management will be used only in the infrequent event of low reserves.

Note: In the following description, terminology will adhere to the 5G names and components, even though they are equally suitable for 4G.

Today, the control of the charging method for a specific network service resides in the policy and charging control (PCC) rule that can be provided by PCF (while the default charging method for the Protocol Data Unit (PDU) session is provided in the charging characteristics), and it is a part of the negotiations done in Gx (in 4G) or Npcf invocations (in 5G). The charging method is then valid for the overall lifetime of the network session and no function (SMF, PCF or CHF) can change it.

The present embodiments shown in FIGS. 1-3 provide an alternate flow, in which the PCC rule can contain a third type of charging method which is 'Dynamic Charging'. The Dynamic Charging method indicates to the SMF that the charging method of the requested network session is controlled by CHF and can be switched from online to offline and vice versa at any interaction between CHF and SMF.

In the first communication from the SMF to the CHF, the CHF decides what charging method needs to be applied according to the amount of balance reserves it has for the service requested. If the reserves are high, it is expected to request an offline method, to reduce the amount of computation and handling required. It also sets a time and volume limit for the session connection for the next check.

When the next check arrives, it performs the same decision again, until either a change of the method is applicable or the session is terminated by the user. If a change is applicable, the CHF announces it to the SMF as part of the response, and also allocates the appropriate information per the method. In particular, the information may include a quota and validity time for online charging, whereby if the validity time is reached before full consumption of the quota, a new request for new quota must be made, returning the unused quota to the CHF. The online indication can be explicit or implicit. By simply supplying the quota and VT parameters, the CHF can indicate that the following section of the network session needs to be monitored more closely, using the exact method of online charging. If these parameters are not supplied, the SMF will assume that the session is offline, and will be subject only to the non-quota triggers which are part of the response.

The advantage of the implicit mechanism is that it does not require any change in the current interface. It can be implemented using minimal changes in the SMF, PCF and CHF.

The explicit implementation of the switch will be performed by the result code mechanism inherent for both Diameter and 5G protocols, as described by the underlined text in FIG. 3.

SUCCESS: The CHF grants the service to the end-user.

END_USER_SERVICE_DENIED: The CHF denies the service request due to end-user service restrictions or limitations related to the end-user (i.e. terminate services for the rating group). If the request contained used units they shall be deducted, if applicable.

END_USER_SERVICE_REJECTED: The CHF denies the service request in order to terminate the service for which credit is requested.

RATING_FAILED: The CHF determines that the service cannot be rated due to insufficient rating input, incorrect parameter combination or unrecognized parameter, or parameter value.

SUSPEND_QUOTA_MANAGEMENT: The CHF has determined that quota management can be suspended for the service, but holds the option of switching back to quota management later. This result requires that the volume limit defined for the PDU session will be significantly smaller than the remaining allowance available for the user, to make sure such return to quota management will be timely.

APPLY_QUOTA_MANAGEMENT: Assuming that all reports of the relevant RG were offline (MQI=FALSE or absent), it now requires the RG to be online, and assigns a quota to it. In such a case, Granted-units and Validity-time must also be supplied in the MUI.

The implicit implementation will be performed by either issuing Quota and validity-time—indicating in the message that the service must be treated by the SMF according to online charging, or by omitting these parameters, thus declaring that the network session should be treated with offline charging (until communicated otherwise).

The embodiments described above transfer the responsibility for offline/online charging method control to the CHF, instead of deciding it in the PCF and PCC rules. It simplifies the flow and reduces the amount of control communication required per session, while still maintaining the high level of control of the session.

This has the potential of reducing the operating expense of the charging system significantly by creating a simpler and more understandable implementation with higher flexibility.

Figure 4:
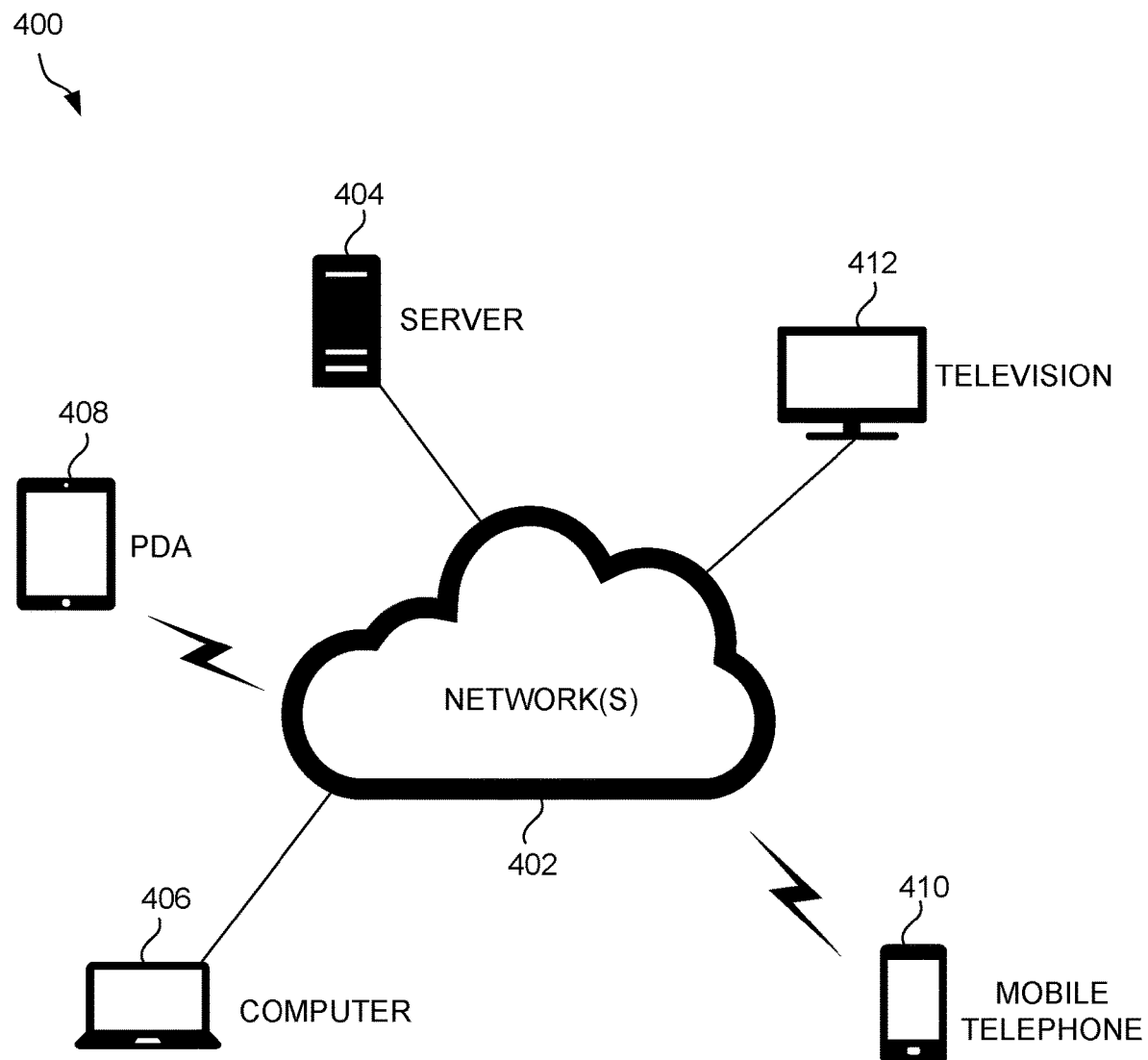
FIG. 4 illustrates a network architecture, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
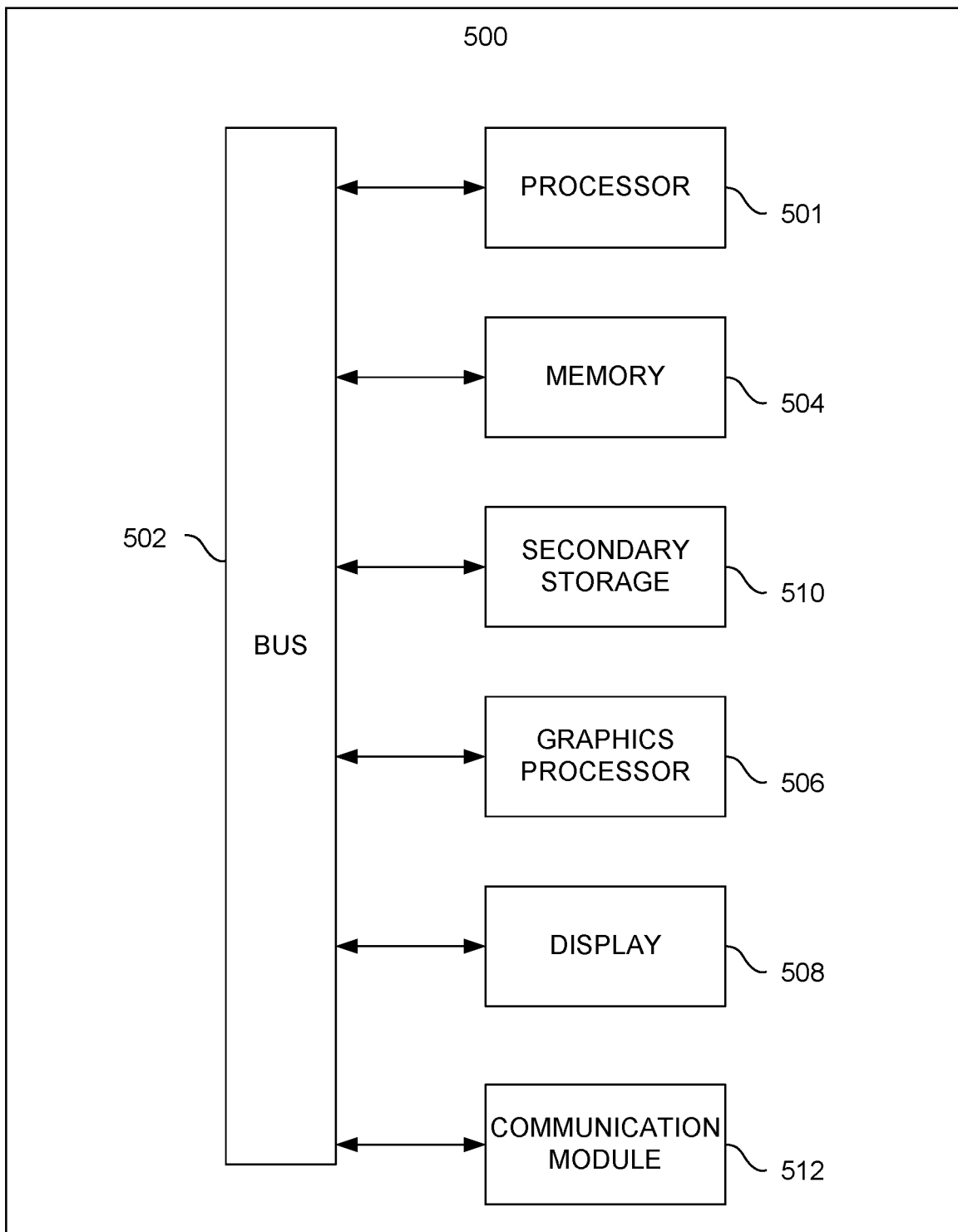
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    monitoring a network session established between a plurality of communication devices;
    during the network session, determining one or more characteristics of the network session, based on the monitoring of the network session, wherein the one or more characteristics of the network session include a balance of an allowed limit of network service usage for a communication device of the plurality of communication devices; and
    dynamically selecting between offline charging and online charging for the network session, based on the one or more characteristics of the network session including at least one of:
    selecting the offline charging for the network session when the balance of the allowed limit of the network service usage is above a predefined threshold, or
    selecting the online charging for the network session when the balance of the allowed limit of the network service usage is below the predefined threshold.

2. The non-transitory computer readable medium of claim 1, wherein the network session is established with a dynamic charging mode.

3. The non-transitory computer readable medium of claim 2, wherein the monitoring, determining, and selecting are repeated while the network session is assigned the dynamic charging mode.

4. The non-transitory computer readable medium of claim 1, wherein determining one or more characteristics of the network session is repeated for each interaction between a session management function and a charging function in association with the network session.

5. The non-transitory computer readable medium of claim 1, wherein the monitoring, determining, and selecting are performed for a communication device of the plurality of communication devices.

6. The non-transitory computer readable medium of claim 5, wherein the one or more characteristics of the network session include a balance of an allowed limit of network service usage for the communication device.

7. The non-transitory computer readable medium of claim 1, wherein the allowed limit of network service usage is defined in a subscription of the communication device to a network service.

8. The non-transitory computer readable medium of claim 6, wherein the offline charging requires less resource usage than the online charging.

9. The non-transitory computer readable medium of claim 8, wherein the resource usage includes control signaling.

10. The non-transitory computer readable medium of claim 6, wherein the online charging requires more resource usage than the offline charging to continuously manage the balance of the allowed limit during the network session.

11. The non-transitory computer readable medium of claim 10, wherein the resource usage includes control signaling.

12. The non-transitory computer readable medium of claim 1, wherein the offline charging is a charging mechanism that is unable to affect the network session in real-time.

13. The non-transitory computer readable medium of claim 1, wherein the online charging is a charging mechanism that is able to affect the network session in real-time.

14. The non-transitory computer readable medium of claim 13, wherein the online charging requires direct interaction of a charging function with a session management function.

15. The non-transitory computer readable medium of claim 1, wherein the network session is established with a dynamic charging mode selected by a charging function of a system.

16. The non-transitory computer readable medium of claim 15, wherein the dynamic charging mode selected by the charging function of the system indicates to a session management function of the system that the dynamic selection between the offline charging and the online charging will be controlled by the charging function.

17. A method, comprising:
monitoring a network session established between a plurality of communication devices;
during the network session, determining one or more characteristics of the network session, based on the monitoring of the network session, wherein the one or more characteristics of the network session include a balance of an allowed limit of network service usage for a communication device of the plurality of communication devices; and
dynamically selecting between offline charging and online charging for the network session, based on the one or more characteristics of the network session including at least one of:
selecting the offline charging for the network session when the balance of the allowed limit of the network service usage is above a predefined threshold, or
selecting the online charging for the network session when the balance of the allowed limit of the network service usage is below the predefined threshold.

18. A system, comprising:
a non-transitory memory storing instructions; and
one or more processors in communication with the non-transitory memory that execute the instructions to perform a method comprising:
monitoring a network session established between a plurality of communication devices;
during the network session, determining one or more characteristics of the network session, based on the monitoring of the network session, wherein the one or more characteristics of the network session include a balance of an allowed limit of network service usage for a communication device of the plurality of communication devices; and
dynamically selecting between offline charging and online charging for the network session, based on the one or more characteristics of the network session including at least one of:
selecting the offline charging for the network session when the balance of the allowed limit of the network service usage is above a predefined threshold, or
selecting the online charging for the network session when the balance of the allowed limit of the network service usage is below the predefined threshold.

* * * * *